United States Patent Office 3,259,638
Patented July 5, 1966

3,259,638
OXIDATION OF OLEFINES
Kenneth Allison, Sunbury-on-Thames, England, assignor to The British Petroleum Company Limited, London, England, a British joint-stock corporation
No Drawing. Filed Nov. 19, 1963, Ser. No. 324,869
Claims priority, application Great Britain, Nov. 20, 1962, 43,828/62; Jan. 24, 1963, 3,005/63; Apr. 10, 1963, 14,327/63; May 28, 1963, 21,252/63
11 Claims. (Cl. 260—348.5)

This invention relates to the oxidation of olefins and particularly to the liquid phase catalytic oxidation of olefins with molecular oxygen.

It is known that olefins can be oxidised in the liquid phase with molecular oxygen in the presence of catalysts such as salts of cobalt, copper, vanadium and manganese, and that when oxidation is carried out at higher temperatures and pressures a number of oxidation products may be obtained which include alcohols, adehydes, ketones, ethers, olefin oxides, acids and esters, the relative proportions of such compounds present in the oxidate depending to some extent on the reaction conditions employed. Thus, relatively high proportions of olefin oxides have been obtained by regulation of the pH of the reaction medium to neutral or slightly alkaline. Other compounds detected in olefin oxidates include glycols and alkenyl hydroperoxides and it has been reported that high proportions of alkenyl hydroperoxides are present in the oxidate when the percentage conversion of olefins during oxidation is low.

It has now been surprisingly found that high yields of epoxy-alcohols may be obtained from the liquid phase catalytic oxidation of olefins with molecular oxygen if certain criteria are satisfied during the oxidation.

According to the present invention there is provided a process for the production of epoxy-alcohols which comprises oxidising an olefin in the liquid phase with molecular oxygen in the presence of a catalyst comprising at least one metal selected from Group IV–A, V–A or VI–A of the Periodic Table or a compound thereof, but excluding chromium or a compound thereof, the reaction conditions being such and the olefin being so selected that in the absence of said catalyst, the liquid phase uncatalysed oxidation of said olefin with molecular oxygen gives rise to substantial proportions of hydroperoxides of the same carbon number as said olefin.

Some olefins appear more susceptible to the formation of hydroperoxides of the same carbon number than others. Thus with some olefins e.g. 4-methylpentene-2, it is possible to obtain high proportions of hydroperoxides in the primary oxidate from liquid phase uncatalysed oxidation with molecular oxygen even at relatively high conversions and relatively high temperatures, whereas with others e.g. butene-1, hexene-1 it is necessary to operate at low conversions and relatively low temperatures, and indeed some, e.g. butene-2 or beta-diisobutene, show little or no tendency to yield hydroperoxides of corresponding carbon number in the primary oxidate under any oxidation conditions. The structure of the olefin exerts great influence on the proportions by hydroperoxides obtainable and generally, but not exclusively, the proportions of hydroperoxides present in the primary oxidate will be higher at low conversions of the olefins. The correlation of olefin and oxidation conditions to provide substantial proportions of hydroperoxides during liquid phase uncatalysed oxidation with molecular oxygen is a relatively simple matter which may be achieved with minimum experimentation particularly having regard to the published literature on the subject, e.g. Trans. Far. Soc. 1950, 46, 358 and 1956, 52, 89.

Preferred olefins which may be used as feed in the process of the present invention are internal olefins which have a secondary or tertiary carbon atom alpha to the double bond, that is to say olefins containing the structure

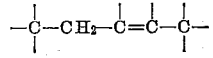

or

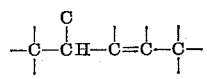

Particularly preferred olefins are those of formula:

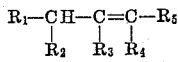

where $R_1$ and $R_5$, being the same or different, are alkyl, aryl, aralkyl, or alkaryl radicals or together may complete a carbocyclic ring, and $R_2$, $R_3$ and $R_4$, being the same or different, are hydrogen atoms, or alkyl, aryl, aralkyl or alkaryl radicals. Examples of such olefins are pentene-2, hexene-2, 2-methylpentene-2, 4-methylpentene-2, 3-methylpentene-2, cyclo-hexene and methyl-cyclo-hexenes. Other olefins which are also suitable for use in the process of the invention are 2-ethylbutene-1 and 3-methylbutene-1.

The term compound used herein means organic or inorganic compounds or complexes containing said metal.

Exemplary of the metal compounds which may be used as catalysts in the present process are oxides; acids, including heteropolyacids, or salts or organic esters thereof; salts of organic acids; hydroxides; hydrated oxides; inorganic salts; organic complexes; carbonyls; and hydrides. If desired the compounds may be used in their per-form, that is to say in the form derivable from reaction with hydrogen peroxide.

Suitable metals in the above mentioned groups are titanium, zirconium, hafnium, vanadium, niobium, tantalum, molybdenum and tungsten. Typical oxides of these metals which may be used are vanadium pentoxide, niobium pentoxide and tantalum pentoxide. Typical acids are molybdic acid and tungstic acid. Typical acid salts are sodium orthovanadate and ammonium metavanadate, whilst typical organic esters of the acids are vanadic esters desirably alkyl esters e.g. n-butyl or n-heptyl vanadates or ortho-titanate esters of which a specific example is tetra n-butyl ortho-titanate. Typical salts of organic acids are vanadium naphthenate, vanadium stearate and vanadium oleate. A typical hydrated oxide is zirconium dioxide hydrate. Typical inorganic salts are vanadic sulphate $V_2(SO_4)_3$, vanadium halides e.g. $VCl_3$, zirconium nitrate or sulphate and particularly oxy-salts such as vanadyl sulphate $VOSO_4$ or vanadium oxychloride $VOCl_3$. Suitable heteropoly acids and salts thereof are tungstovanadic acid, molybdo-vanadic acid, ammonium molybdovanadate and potassium tungsto-vanadate. Suitable organic complexes are vanadium, vanadyl or molybdenyl acetylacetonates, vanadium-containing complexes of quinoline, 8-hydroxyquinoline, etioporphyrins and phhalocyanins. Suitable carbonyls are molybdenum hexa-carbonyl and tungsten hexacarbonyl.

Preferred metals are vanadium, molybdenum and tungsten, and inorganic or organic compounds containing these metals are the preferred catalyst materials. The most preferred compound is vanadium naphthenate.

The metal compounds used may, if desired, be supported on a carrier material which is inert with respect to the reaction system e.g. pumice and kieselguhr.

Already specified, the reaction conditions are such and the olefin feed is so selected that in the absence of the specified catalysts, the liquid phase uncatalysed oxidation of said olefin with molecular oxygen gives rise to substantial proportions of hydroperoxides in the primary oxidate. Reaction temperatures may in general range from 0–200° C., preferably from room temperature to 150° C. or even higher depending on the olefin feed, but for most olefins temperatures within the range 55–75° C. are preferred. Reaction pressures are sufficient to maintain the olefin feed in the liquid phase although higher pressures may be employed if so desired. Although not absolutely essential, it is preferred to operate the process at low conversions of the olefin i.e. conversions up to 15% to minimise the formation of by-products and to maximise the proportion of epoxy-alcohols present in the oxyproducts. The preferred conditions of oxidation may be summarised by the expression "low severity oxidation."

The process may be conducted batchwise but readily lends itself to continuous operation, e.g. where the liquid olefin is passed through a column packed with the catalyst in the presence of oxygen. In one embodiment the reaction may be effected by means of a so-called "Trickle phase process" wherein both the feed olefin in the liquid phase and oxygen are passed downwardly through a vertical column containing the catalyst in the form of a stationary bed. The feed olefin effectively contacts the bed of catalyst as a thin liquid film.

The amount of oxygen or air used is usually in slight excess of that required by the olefin being oxidised.

The reaction is carried out in the liquid phase with or without the presence of a solvent which is inert under the reaction conditions employed. Suitable solvents are e.g. benzene, tertiary butyl benzene or chlorobenzene.

This invention will be more clearly understood by reference to the following examples.

In Examples 1 to 19, the feed olefins were added to a glass reaction vessel in amounts of approximately 50 gms. and refluxed at the temperatures and in the presence of the catalysts specified in Table 1, for the specified times. Oxygen was continuously bubbled into the reaction vessel during the reaction period. The liquid products were analysed and the olefin oxide and epoxy-alcohol content of the oxidates are set out in the table. The remainder of the oxidate was made up of individual small amounts of ketones and alcohols. The epoxy-alcohols could be recovered from the oxidate by distillation. Examples 18 and 19 are by way of comparison and illustrate the very low percentage of epoxy-alcohols in the oxidate when cobalt naphthenate or chromium naphthenate was used to catalyse the oxidation. In all of Examples 1–19, whether 2-methylpentene-2 or 4-methylpentene-2 was used as feed, the two epoxy-alcohols produced were identical i.e. E.A. 1 is 3,4-epoxy-2-methylpentanol-2 and E.A. 2 is 2,3-epoxy-2-methylpentanol-4.

The oxide tabulated for 2-methylpentene feeds was 2,3-epoxy-2-methylpentane and for 4-methylpentene-2 feed was 2,3-epoxy-4-methylpentane. Example 7 was carried out in the presence of magnesium oxide in the weight ratio to vanadyl sulphate of 2:1. Example 11 was carried out in the presence of magnesium oxide in the weight ratio to vanadyl chloride of 1:2.

TABLE 1

| Example | Feed olefin | Catalyst | Temp., °C. | Time, hrs. | Percent conversion of olefin | Oxidate product distribution, percent wt. | | |
|---|---|---|---|---|---|---|---|---|
| | | | | | | Oxide | E.A. 1 | E.A. 2 |
| 1 | 2-methylpentene-2 | Vanadium naphthenate | 65 | 22 | 5 | 29 | 16 | 32 |
| 2 | do | Tungstic acid | 65 | 23 | 14 | 27 | 10 | 35 |
| 3 | do | Niobium pentoxide | 65 | 28 | 4 | 29 | 6 | 24 |
| 4 | do | Tetra n-butyl ortho-titanate | 65 | 12 | 5 | 30 | 6 | 18 |
| 5 | do | Ammonium metavanadate | 65 | 15 | 10 | 31 | 10 | 35 |
| 6 | do | Vanadium pentoxide | 65 | 14 | 6 | 32 | 9 | 34 |
| 7 | do | Vanadyl sulphate | 65 | 30 | 7 | 27 | 20 | 38 |
| 8 | 4-methylpentene-2 | Vanadium naphthenate | 54 | 21 | 5 | 4 | 22 | 54 |
| 9 | 2-methylpentene-2 | Penta n-butyl orthoniobate | 65 | 25 | 7 | 40 | 5 | 17 |
| 10 | do | Niolium pentachloride | 64 | 34 | 16 | 38 | 2 | 21 |
| 11 | do | Vanadyl chloride | 63–65 | 22 | 4 | 29 | 10 | 34 |
| 12 | do | Vanadyl phthalocyanine | 65–67 | 15 | 12 | 31 | 9 | 38 |
| 13 | do | Ammonium vanadotungstate | 65 | 26 | 15 | 31 | 14 | 39 |
| 14 | do | Vanadium metal | 64–66 | 24 | 20 | 31 | 11 | 35 |
| 15 | do | Vanadium etioporphysin | 61–64 | 24 | 7 | 26 | 13 | 41 |
| 16 | do | Tetra n-butyl orthovanadate | 60–65 | 17 | 14 | 31 | 18 | 31 |
| 17 | do | Molybdenum hexacarbonyl | 62–65 | 25 | 15 | 41 | 5 | 19 |
| 18 | do | Cobalt naphthenate | 64 | 6½ | 9 | 26 | 4 | 1 |
| 19 | do | Chromium naphthenate | 62 | 13 | 8 | 26 | 5 | 7 |

There may be present in the reaction medium an inorganic or organic alkaline material e.g. pyridine or magnesium oxide in an amount sufficient to inhibit any tendency for acid-promoted side reactions to occur, e.g. acid hydrolysis of the epoxy-alcohol to the corresponding triol.

Such hydrolysis may occur with the more acidic catalysts which may be used e.g. vanadyl sulphate, or may occur due to acid formation in the oxidate product. A further method of minimising the acid-promoted side reactions is to use an alkaline scrubber, through which oxidate is passed and recycled to the oxidation reaction zone.

The epoxy-alcohols produced by the process of the present invention may be recovered from the reaction products by straight forward distillation, or water extraction of the reaction products.

The epoxy-alcohols produced will have the same carbon number and carbon skeleton as the feed olefin and have the epoxy and hydroxyl groups on adjacent carbon atoms. These epoxy alcohols are useful for various purposes. For example they are useful intermediaries in the preparation of epoxy-resins, or by homopolymerisation to give polyether homopolymers. They are capable of hydrolysis, usually under mild aqueous acidic conditions to obtain triols, which are useful cross-linking agents in the formation of polyester resins.

*Example 20*

The method employed for Examples 1 to 19 was repeated using cyclohexene as the feed olefin, and vanadium naphthenate and cobalt naphthenate as catalysts. The proportions of oxide and epoxy-alcohol in the oxidation products is set out in Table 2. No epoxy-alcohols were detected in the oxidate produced using cobalt naphthenate.

TABLE 2

| Run | Catalyst | Temp., °C. | Time, hrs. | Percent Conversion of olefin | Oxy-product distribution, Percent wt. | |
|---|---|---|---|---|---|---|
| | | | | | Oxide a | Epoxy-alcohol b |
| 1 | VN | 55 | 15 | 15 | 31 | 24 |
| 2 | CoN | 50–56 | 6½ | 10 | 3 | | a cyclohexane-1,2-epoxide.
b 2,3-epoxy-cyclohexanol-1.
VN—Vanadium naphthenate.
CoN—Cobalt naphthenate.

The oxidate in Run 2 had a high hydroperoxide content, the remainder being mainly unsaturated ketone and alcohol.

Example 21

The method employed for Examples 1 to 19 was repeated using hexene-2 as the feed olefin and vanadium naphthenate and cobalt naphthenate as the catalysts. The proportions of oxide and epoxy-alcohols in the oxidates obtained are set out in Table 3. No epoxy-alcohols were detected in the oxidate produced using cobalt naphthenate.

TABLE 3

| Run | Catalyst | Temp., °C. | Time, hrs. | Percent Conversion of olefin | Oxy-product distribution, Percent wt. | |
|---|---|---|---|---|---|---|
| | | | | | Oxide a | Epoxy-alcohol b |
| 1 | VN | 64 | 36¾ | 10 | 19 | 48 |
| 2 | CoN | 66 | 31 | 10 | 20 | | a 2,3-epoxy-hexane.
b Principally 3,4-epoxyhexanol-2 and 2,3-epoxy-hexanol-4.
VN—Vanadium naphthenate.
CoN—Cobalt naphthenate.

The remainder of the oxidates comprises unsaturated ketones and alcohols, the oxidate from Run 2 also having a high hydroperoxide content.

Example 22

4-methylpentene-2 was oxidised with vanadium naphthenate to two different levels of olefin conversion at 75° C. In the first run, which was continued for 35 hours, the percentage conversion of feed was 48 and the oxidate contained 12% wt. 2,3-epoxy-4-methylpentane, 21% wt. 3,4-epoxy-2-methylpentanol-2 and 47% wt. 2,3-epoxy-2-methylpentanol-4. The corresponding percent wts. for the second run, which was continued for 59 hours to an olefin conversion of 93%, were 11, 17 and 9. In the second run there was produced 51% of a high boiling material which consisted mainly of the triol 2,3,4-trihydroxy-2-methylpentane and its esters. This triol and its esters were most probably formed by hydrolysis of the epoxy-alcohols due to the small amount of acid produced during the prolonged reaction period.

Example 23

In a trickle phase experiment, 2-methylpentene-2 was passed downwardly at a space velocity of 4.7 v./v./hr. together with oxygen at a rate of 0.75 l./hr. in a vertical column over a stationary bed of catalyst consisting of vanadium pentoxide supported on pumice. The catalyst contained 6% wt. of vanadium. The process was continued for 10.5 hours and the total product was analysed. 6% conversion of the olefin had taken place and the oxy-products contained:

| | Percent weight |
|---|---|
| 2-methylpentane-2,3-oxide | 27 |
| 2-methyl-2-hydroxy-pentane-3,4-oxide | 19 |
| 2-methyl-4-hydroxy-pentane-2,3-oxide | 24 |

The remainder of the oxy-product was made up of individual small amounts of ketones and alcohols. The epoxy-alcohols were recovered by distillation.

Example 24

The method employed for Examples 1–19 was repeated using 3-methylpentene-2 as feed olefin and vanadium naphthenate was catalyst. The run is compared with an analogous run in which the oxidation is uncatalysed.

The data in Table 4 clearly show that the olefin and reaction conditions were such that in the liquid phase uncatalysed oxidation with molecular oxygen, the primary oxidate contained a high proportion of hydroperoxides of the same carbon number as the olefin, and that under substantially the same conditions but using vanadium naphthenate as catalyst epoxy-alcohols are formed.

TABLE 4

| Run | Catalyst | Temp °C | Time hrs. | Percent conversion of olefin | Oxy-product distribution, Percent wt. | | |
|---|---|---|---|---|---|---|---|
| | | | | | Oxide a | Epoxy-alcohol b | ROOH |
| 1 | None | 66–67 | 22 | 20 | 50 | 5 | 33 |
| 2 | VN | 66–67 | 15 | 13 | 43 | 37 | 0.5 | a 2,3-epoxy-3-methylpentane.
b 2,3-epoxy-4-hydroxy-3-methylpentene.
VN is vanadium naphthenate.
ROOH is hydroperoxide.

Example 25

The method employed for Examples 1–19 was repeated using 2-ethylbutene-1 as feed olefin and vanadium naphthenate and cobalt naphthenate as catalysts. The proportions of oxide and epoxy-alcohols in the oxidation products is set out in Table 5. No epoxy-alcohols were detected in the oxidate produced using cobalt naphthenate.

TABLE 5

| Run | Catalyst | Temp., °C. | Time, hrs. | Percent Conversion of olefin | Oxy-product distribution, Percent wt. | |
|---|---|---|---|---|---|---|
| | | | | | Oxide a | Epoxy-alcohol b |
| 1 | VN | 60 | 27 | 10 | 26 | 22 |
| 2 | CoN | 60 | 22.5 | 10 | 23 | 0 | a 1,2-epoxy-2-ethylbutane.
b 1,2-epoxy-3-hydroxy-2-ethylbutane and 2,3-epoxy-1-hydroxy-2-ethylbutane.
VN is vanadium naphthenate.
CoN is cobalt naphthenate.

I claim:

1. A process for the preparation of epoxy alcohols having the hydroxy and epoxy groups attached to adjacent carbon atoms, comprising: oxidising a mono-olefinically unsaturated hydrocarbon feedstock material selected from the group consisting of internal olefins having a secondary carbon atom in the alpha position to the double bond, internal olefins and alpha olefins having a tertiary carbon atom in the alpha position to the double bond and 2-ethylbutene-1, the olefin feedstock material having the same carbon number and carbon skeleton as the desired epoxy alcohol product, in the liquid phase with molecular oxygen, in the presence of a catalyst selected from the group consisting of titanium, zirconium, hafnium, thorium, vanadium, niobium, tantalum, uranium, molybdenum, tungsten, and compounds thereof, the oxidation being carried out at temperatures in the range 0 to 200° C., and at such a conversion of the olefin that, in the absence of the said catalyst, the liquid phase oxidation of the said olefin feedstock material produces an oxidate product containing substantial proportions of hydroperoxides of the same carbon number as said olefin feedstock material.

2. A process according to claim 1, in which the compounds used as catalyst are selected from the group consisting of oxides, acids, salts of said acids, organic esters of said acids, heteropoly acids, salts of organic acids, hydroxides, hydrated oxides, inorganic salts, organic complexes, carbonyls and hydrides.

3. A process according to claim 1, in which the mono-olefinically unsaturated hydrocarbon has the formula

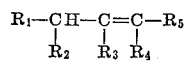

where $R_1$ and $R_5$ are hydrocarbon groups selected from the group consisting of alkyl, aryl, alkaryl and aralkyl groups and hydrocarbon groups which taken together complete a carbocyclic ring, and where $R_2$, $R_3$ and $R_4$ are selected from the group consisting of hydrogen and alkyl, aryl, aralkyl and alkaryl groups.

4. A process according to claim 1, in which an alkaline material is present in the reaction medium in an amount sufficient to inhibit acid-promoted side reactions.

5. A process according to claim 1, in which the oxidate reaction product is passed through an alkaline scrubber and recycled to the oxidation reaction zone.

6. A process according to claim 1, in which the epoxy alcohols are recovered from the reaction products by distillation.

7. A process according to claim 1, in which the epoxy alcohols are recovered from the reaction products by water extraction.

8. A process according to claim 2, in which the catalyst used comprises vanadium naphthenate.

9. A process for the preparation of epoxy alcohols having the hydroxyl and epoxy groups attached to adjacent carbon atoms, comprising: oxidising an olefin selected from the group consisting of pentene-2, hexene-2, cyclohexene, methylcyclohexene, 2-methylpentene-2, 3-methylpentene-2, 4-methylpentene-2, 2-ethylbutene-1, and 3-methylbutene-1, in the liquid phase with molecular oxygen, in the presence of a catalyst selected from the group consisting of titanium, zirconium, hafnium, thorium, vanadium, niobium, tantalum, uranium, molybdenum, tungsten and compounds thereof, the oxidation being carried out at a temperature in the range from room temperature to 150° C. and at an olefin conversion of up to 20%.

10. A process for the preparation of 3,4-epoxy-2-methylpentanol-2 and 2,3-epoxy-2-methylpentene-4, comprising: oxidising in the liquid phase with molecular oxygen an olefin selected from the group consisting of 2-methylpentene-2 and 4-methylpentene-2 in the presence of vanadium naphthenate at a temperature in the range 55° to 75° C. and at an olefin conversion of up to 20%.

11. A process for the oxidation of mono-olefinically unsaturated hydrocarbons to epoxy alcohols having the hydroxy and epoxy groups attached to adjacent carbon atoms and in which the production of substantial amounts of hydroperoxides is suppressed, comprising: oxidising a mono-olefinically unsaturated hydrocarbon feedstock material selected from the group consisting of internal olefins having a secondary carbon atom in the alpha position to the double bond, internal olefins and alpha olefins having a tertiary carbon atom in the alpha position to the double bond and 2-ethylbutene-1, the olefin feedstock material having the same carbon number and carbon skeleton as the desired epoxy alcohol product, in the liquid phase with molecular oxygen, in the presence of a catalyst selected from the group consisting of titanium, zirconium, hafnium, thorium, vanadium, niobium, tantalum, uranium, molybdenum, tungsten, and compounds thereof, the oxidation being carried out at temperatures in the range 0 to 200° C., and terminating the oxidation of said olefin feedstock material when the yield of epoxy alcohols in the reaction product exceeds the yield of epoxy alcohols obtained when the same olefin feedstock material is oxidised under substantially the same conditions of temperature and for substantially the same period of time, in the liquid phase with molecular oxygen, in the presence of a catalyst selected from the group consisting of cobalt and chromium and compounds thereof.

References Cited by the Examiner

UNITED STATES PATENTS

| | | | |
|---|---|---|---|
| 2,650,927 | 9/1953 | Gasson | 260—348.5 |
| 2,741,623 | 4/1956 | Millidge | 260—348.5 |
| 2,769,017 | 10/1956 | Reppe et al. | 260—348.5 |

OTHER REFERENCES

Farmer, E. H., et al., Chemical Society Journal (London), (1942), pp. 121–138.

Farmer, E. H., et al., Trans. Far. Soc., vol. 38 (1942), pp. 348–356.

Hawkins, J. Chem. Soc. (London) (1950), pp. 2169–73.

WALTER A. MODANCE, *Primary Examiner.*

JOHN D. RANDOLPH, *Examiner.*

NORMA S. MILESTONE, *Assistant Examiner.*